United States Patent
Wu et al.

(10) Patent No.: US 8,266,784 B2
(45) Date of Patent: Sep. 18, 2012

(54) PROCESSING MODULE POSITIONING SYSTEM FOR WINDOW BLIND SLATS

(75) Inventors: Shou-Po Wu, Changhua County (TW); Ming-Sung Wu, Changhua County (TW)

(73) Assignee: Jorher Industrial Co., Ltd., Changhua County (TW)

( * ) Notice: Subject to any disclaimer, the term of this patent is extended or adjusted under 35 U.S.C. 154(b) by 830 days.

(21) Appl. No.: 12/422,268

(22) Filed: Apr. 11, 2009

(65) Prior Publication Data

US 2010/0257712 A1    Oct. 14, 2010

(51) Int. Cl.
*B23P 19/04* (2006.01)
*E06B 9/266* (2006.01)

(52) U.S. Cl. ............ 29/564.8; 29/65; 29/33 Q; 29/24.5; 83/699.41

(58) Field of Classification Search .............. 29/24.5, 29/564, 564.1, 564.7, 564.8, 65, 33 S, 33 Q, 29/241, 433; 83/613, 620, 687, 699.31, 699.41, 83/699.51, 699.61

See application file for complete search history.

(56) References Cited

U.S. PATENT DOCUMENTS

| | | | | |
|---|---|---|---|---|
| 4,730,372 A | * | 3/1988 | Tsuchida | 29/24.5 |
| 5,333,365 A | * | 8/1994 | Marocco et al. | 29/24.5 |
| 6,527,686 B1 | * | 3/2003 | Houser et al. | 483/1 |

* cited by examiner

*Primary Examiner* — Erica E Cadugan

(57) ABSTRACT

A processing module positioning system for window blind slats utilizes a position adjustment assembly to move plural processing modules to predetermined positions. The position adjustment assembly includes a servo motor employed to drive a connecting strap. A position control frame is fixed on the connecting strap, so that when the connecting strap is driven to move, the position control frame will be moved by the connecting strap to drive the processing modules connected on the position control frame to move. The position control frame can be connected to and disconnected from the processing modules.

16 Claims, 22 Drawing Sheets

PROCESSING MODULE POSITIONING SYSTEM FOR WINDOW BLIND SLATS

BACKGROUND OF THE INVENTION

1. Field of the Invention

The present invention relates to machines for machining and assembling slats for window blinds; and more particularly to a processing module positioning system for window blind slats for punching holes in and inserting cords through different specifications of window blind slats.

2. Description of the Prior Art

Window blinds are normally provided with plural slats defined with plural holes for passage of ladder cords. The ladder cords cooperate with a control assembly on a head rail to control the tilt angle of the slats. The holes in the slats are formed by a punching machine, and the ladder cords are inserted through the holes in the slats by a cord inserting machine. The number and the spacing of the holes and the ladder cords vary with the form and the length of window blinds. Since the window blinds are mostly produced according to requirements of customers, the number and the spacing of the holes and the ladder cords are required to be adjusted frequently.

The punching machine is provided with plural punching modules for punching holes in the slats. The cord inserting machine is provided with plural cord inserting modules for inserting cords through the holes of the slats. Therefore, the punching modules and the cord inserting modules are adjusted according to the number and the spacing of the holes and the ladder cords of the window blind. Currently, the punching modules and the cord inserting modules are normally adjusted in such a manner that on each of the punching machine and the cord inserting machine is provided a measuring scale with which a user can move the punching machine and the cord inserting machine to a desired position by visual measurement and calculation, and then fix them by screws.

The position determination by visual measurement and manual fixing of the machines are time-consuming and likely to cause position error due to careless mistake.

In addition, although there is such a design that on each of the punching modules and the cord inserting modules is provided a servo motor so that it can drive the modules to move, this design is simple and easy to implement. However, it usually requires 5-7 sets of punching modules and cord inserting modules, so the number of the needed servo motors will be as great as 10 to 14, thus greatly increasing the cost. Furthermore, the programming is relatively complicated since collision must be avoided.

The present invention has arisen to mitigate and/or obviate the afore-described disadvantages.

SUMMARY OF THE INVENTION

The technical problems to be solved:

The existing punching machines and cord inserting machines for processing slats of window blinds are aligned by visual measurement and manually positioned by screws, therefore such a manual fixing of the machines are time-consuming and likely to cause position error due to careless mistake, thus leading to unqualified products and needing re-adjustment.

In order to solve the above technical problems, the present invention provides a processing module positioning system for window blind slats which comprises a base provided with a main slide rail on a top thereof and an auxiliary slide rail at an external side thereof, plural processing modules which are movably disposed on the main slide rail for processing slats, a position adjustment assembly disposed at one side of the base for driving the respective processing modules to move, and a position control frame which is disposed on the auxiliary slide rail and combined with the position adjustment assembly. The position control frame is controlled to move relative to the auxiliary slide rail by the position adjustment assembly, and the plural processing modules and the position control frame are provided with plural linkage rods and plural linkage holes that cooperate with each other in such a manner that the linkage rods can be engaged into or disengaged from the linkage holes to connect or disconnect the processing modules and the position control frame.

The present invention has the following advantages:

The primary objective of the present invention is to provide a processing module positioning system for window blind slats which can reduce production cost and enhance industrial competitiveness by utilizing a position adjustment assembly with a single servo motor to drive a position control frame to move and position plural processing modules.

The secondary objective of the present invention is to provide a processing module positioning system for window blind slats which can simplify programming by utilize a single control type servo motor to control the position control frame to move and position plural processing modules in a good order.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-4, a processing module positioning system for window blind slats in accordance with the present invention comprises:

A punching base 10A is provided with a main slide rail 11A on a top thereof, and an auxiliary slide rail 12A at an external side thereof.

A slat forming assembly 20A is assembled on a start portion of the punching base 10A (through which the slats enter the punching base 10A) for forming and transporting the slats into the punching base 10A.

Figure 1:
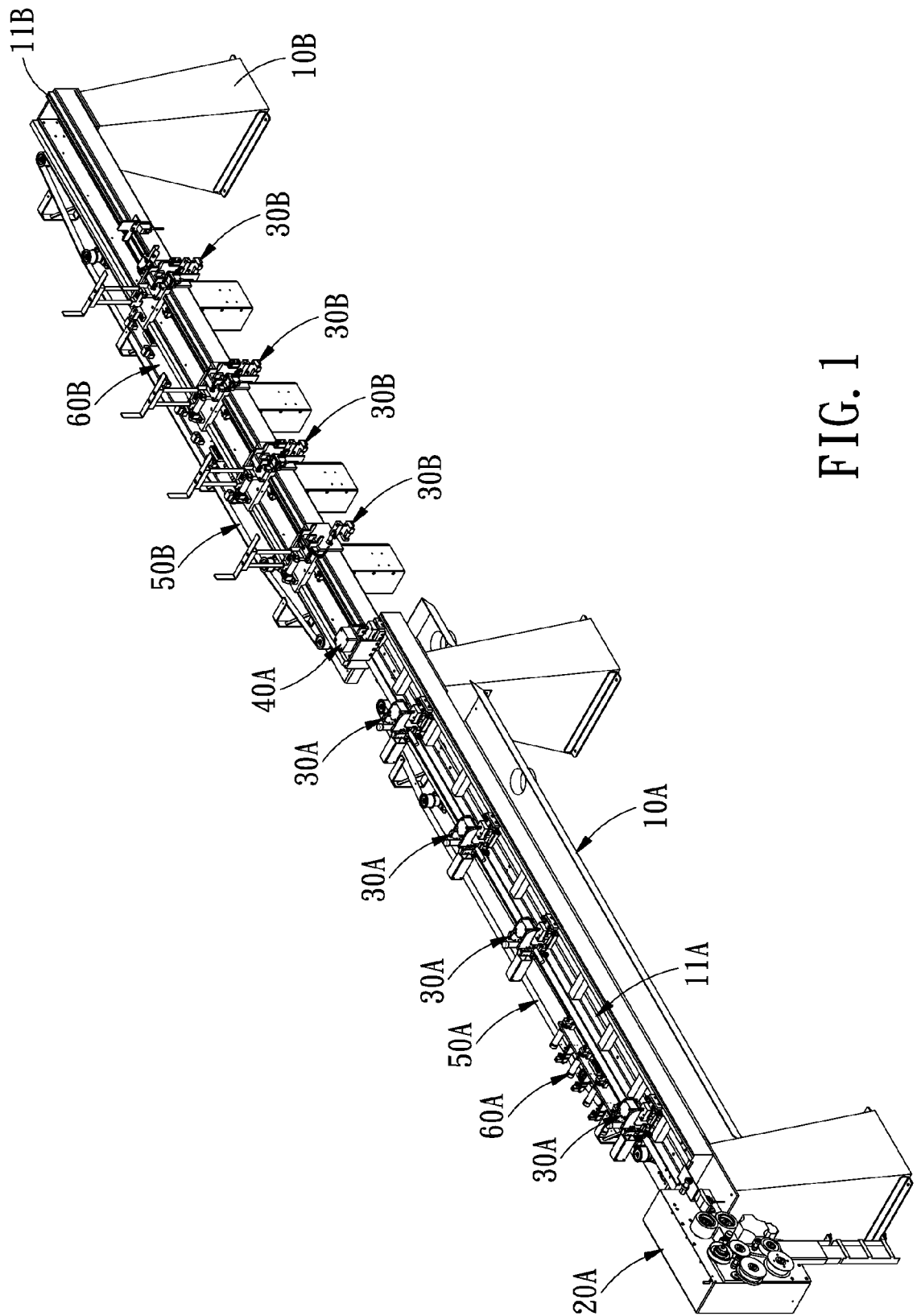
FIG. 1 is a perspective view of a processing module positioning system for window blind slats in accordance with the present invention.
Figure 2:
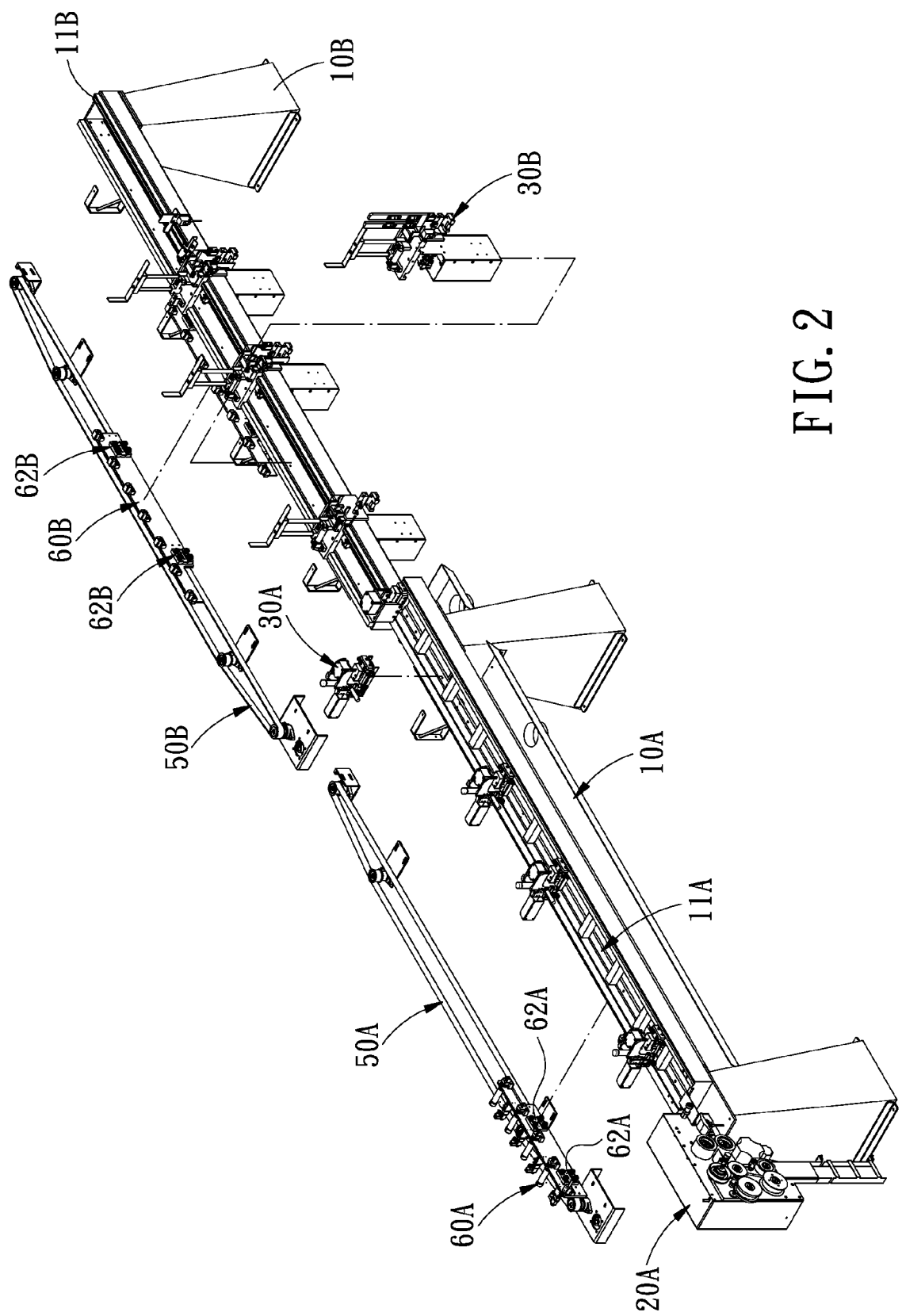
FIG. 2 is an exploded view of a main part of the processing module positioning system for window blind slats in accordance with the present invention.
Figure 3:
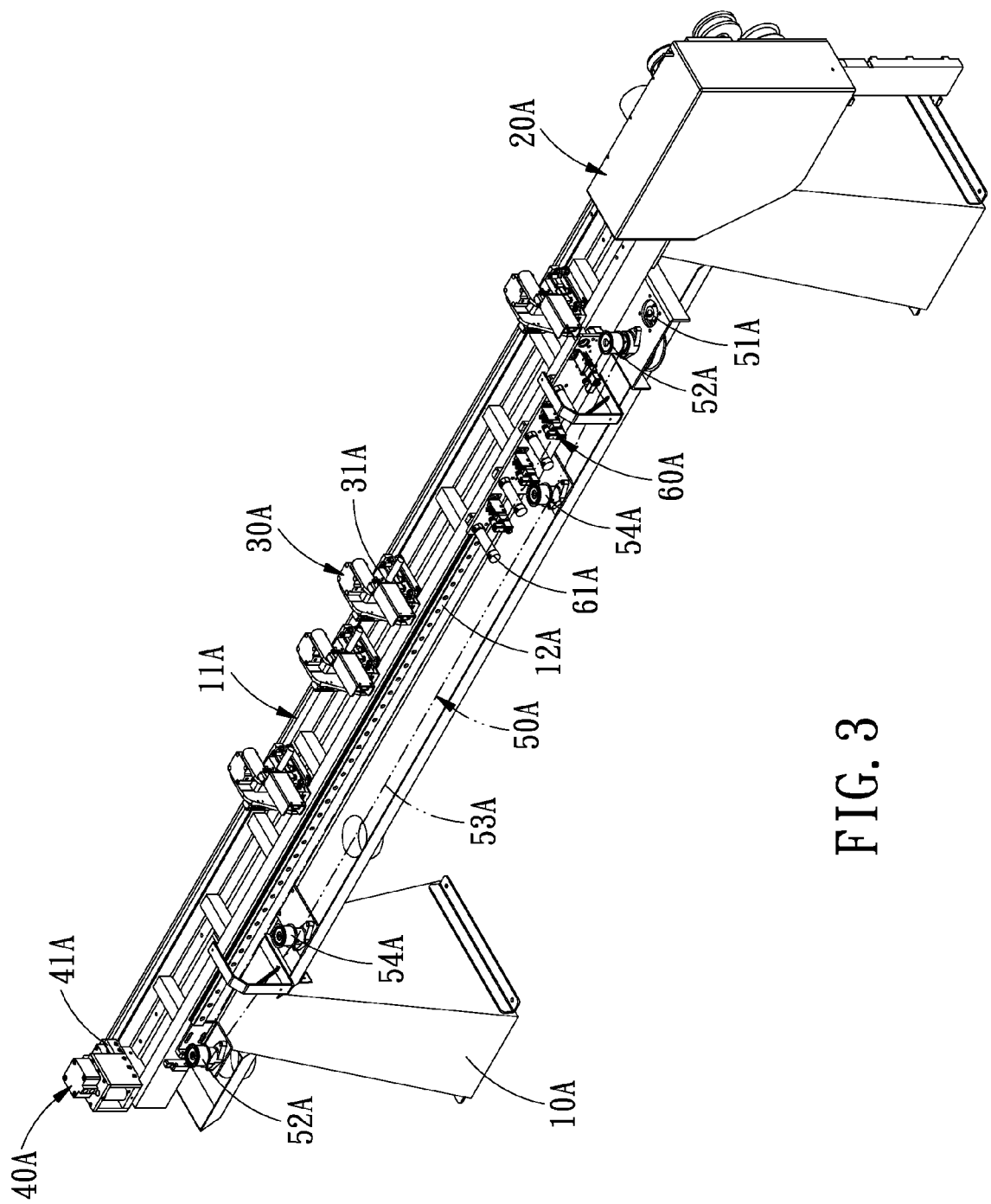
FIG. 3 is a perspective view of a front half of the processing module positioning system for window blind slats in accordance with the present invention.
Figure 4:
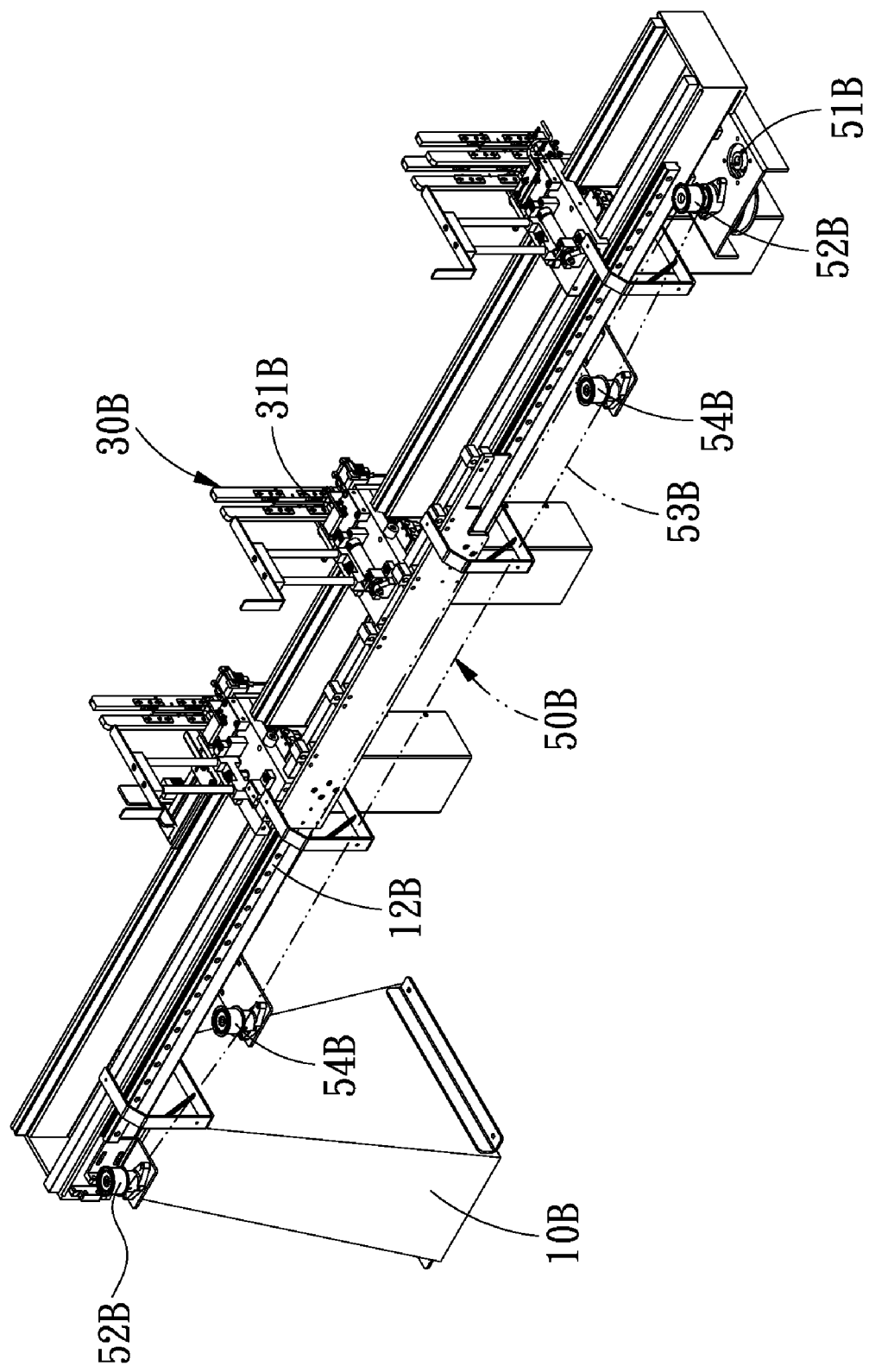
FIG. 4 is a perspective view of a rear half of the processing module positioning system for window blind slats in accordance with the present invention.
Figure 5A:
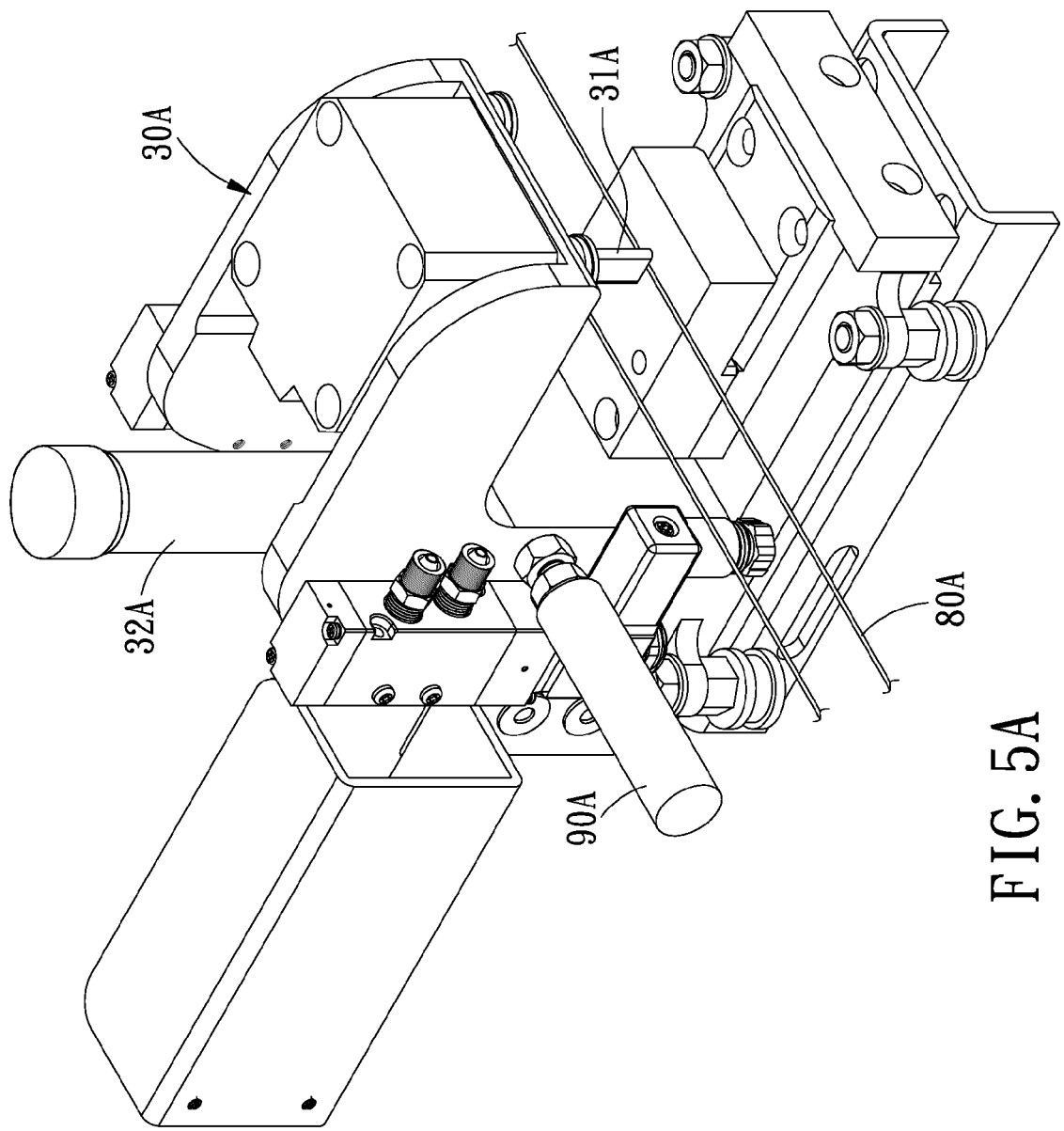
FIG. 5A is a perspective view of a hole processing module in accordance with the present invention.
Figure 5B:
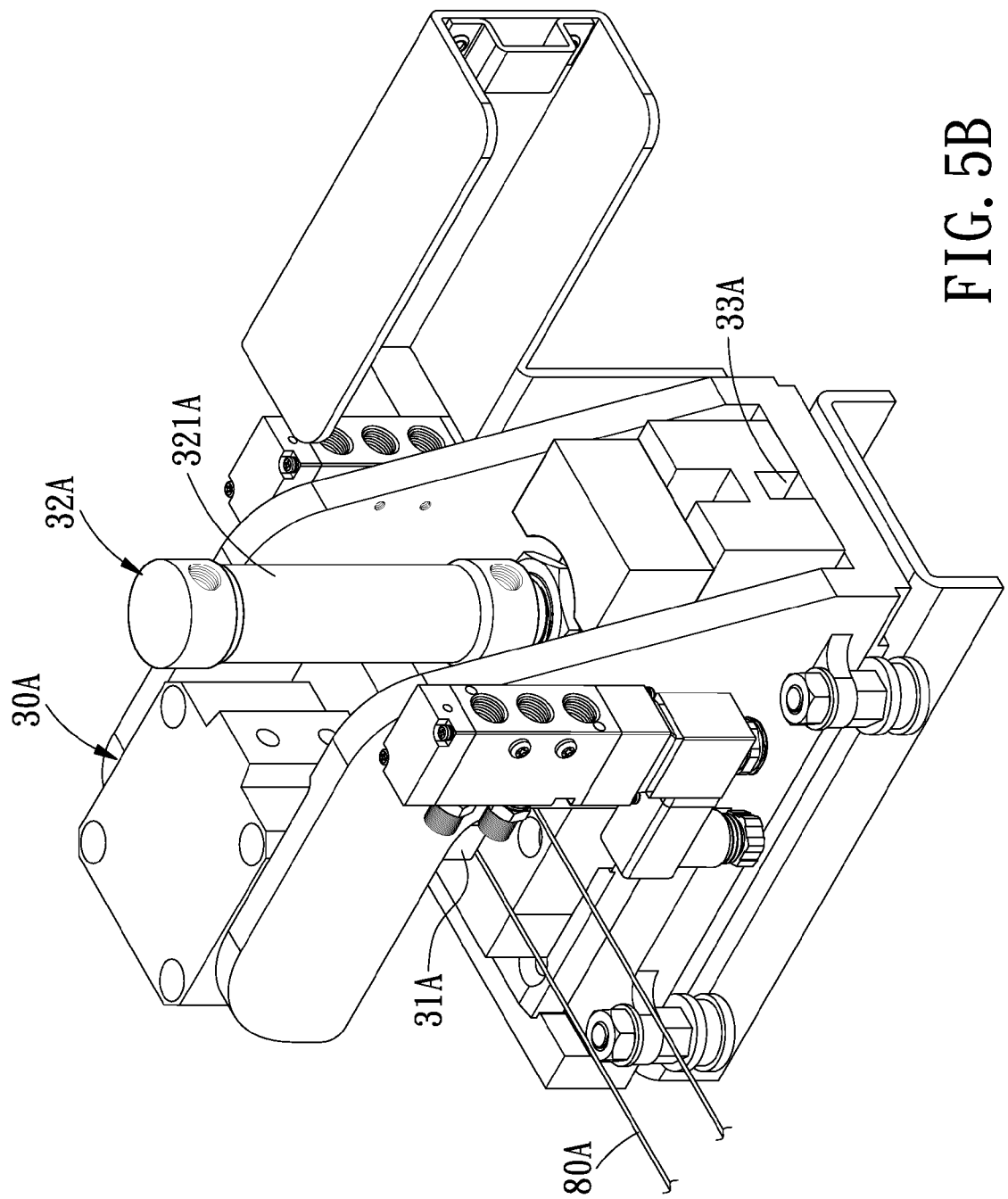
FIG. 5B is another perspective view of the hole processing module in accordance with the present invention.
Figure 13A:
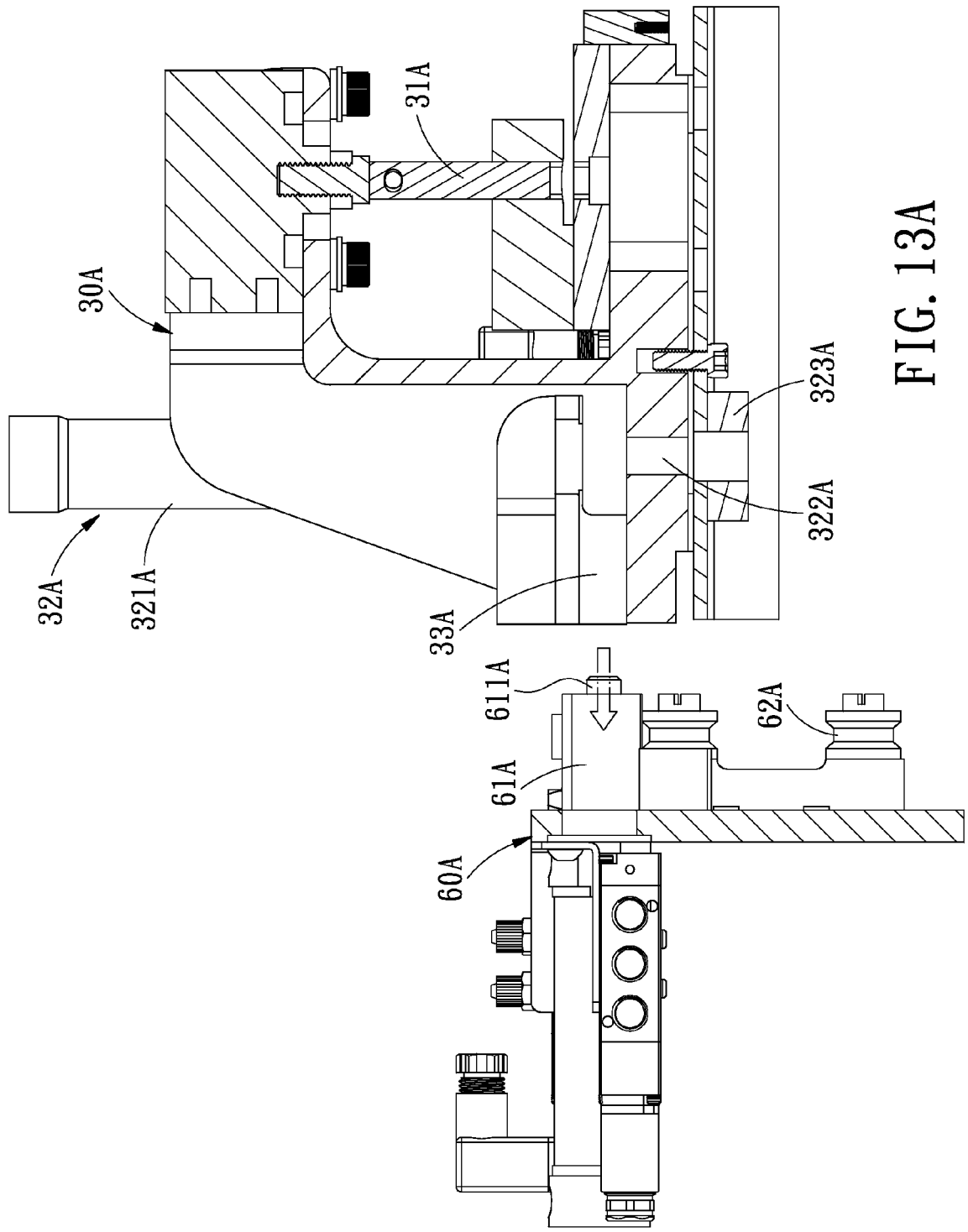
FIG. 13A is a cross sectional view showing how the hole processing module is disconnected from the hole position control frame in accordance with the present invention.
Figure 13B:
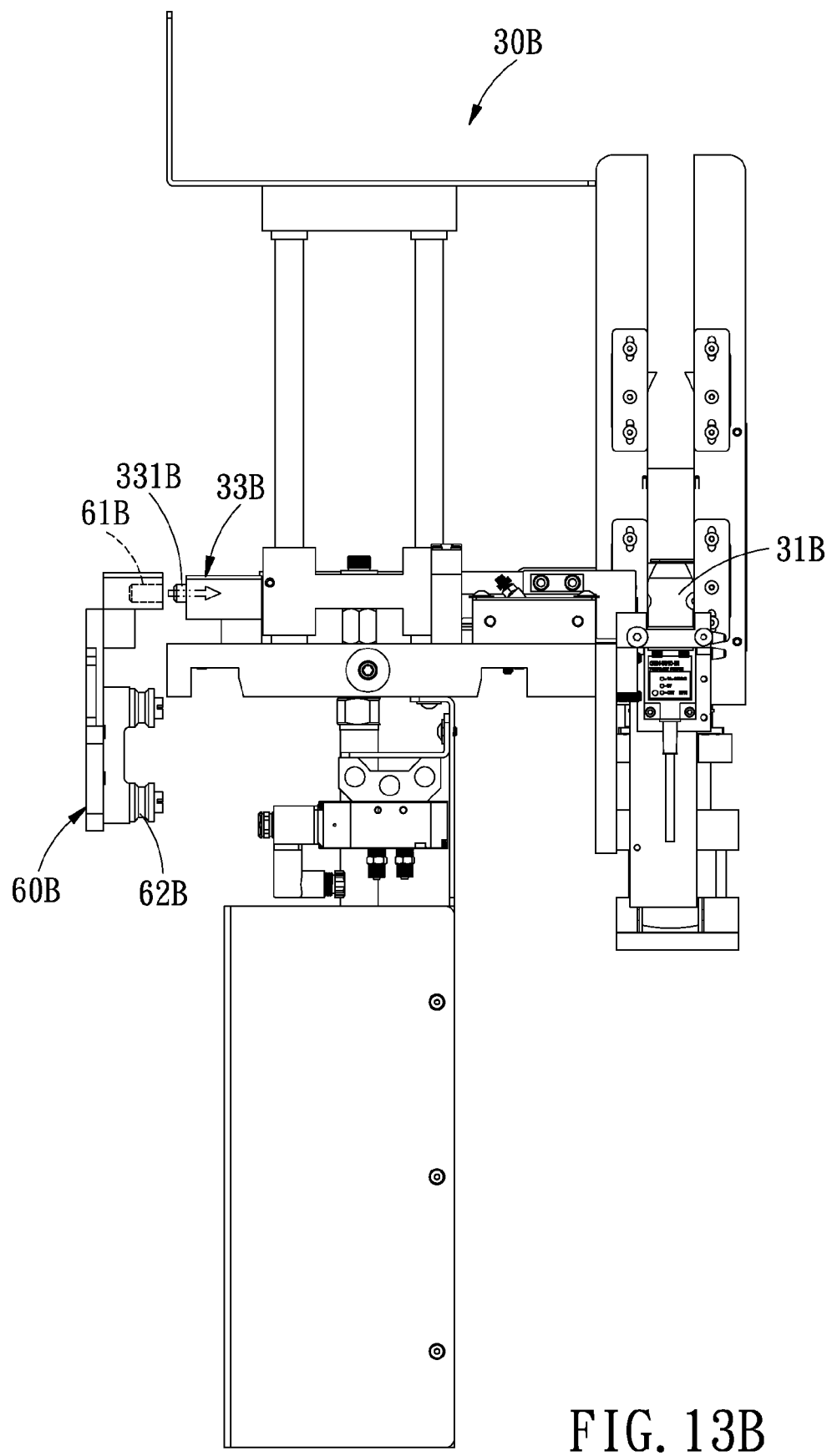
FIG. 13B is a side view showing how the cord processing module is disconnected from the cord position control frame in accordance with the present invention.

Plural hole processing modules 30A, as shown in FIGS. 5A and 5B, are movably disposed on the main slide rail 11A and each include a punching portion 31A for punching holes in the slats, and a limit assembly 32A opposite the main slide rail 11A. The limit assembly 32A includes a power cylinder 321A which has an extension rod 322A (as shown in FIG. 13A) provided on an extended end thereof with a clamping block 323A under the main slide rail 11A. When being retracted (the extension rod 322A retracts), the clamping block 323A will be caused to clamp against the main slide rail 11A to fix the corresponding hole processing module 30A on the main slide rail 11A. When the extension rod 322 A extends, the cord processing module 30A will be released and allowed to move relative to the main slide rail 11B. Further, the respective hole processing modules 30A are further defined with a linkage hole 33A.

Figure 6:
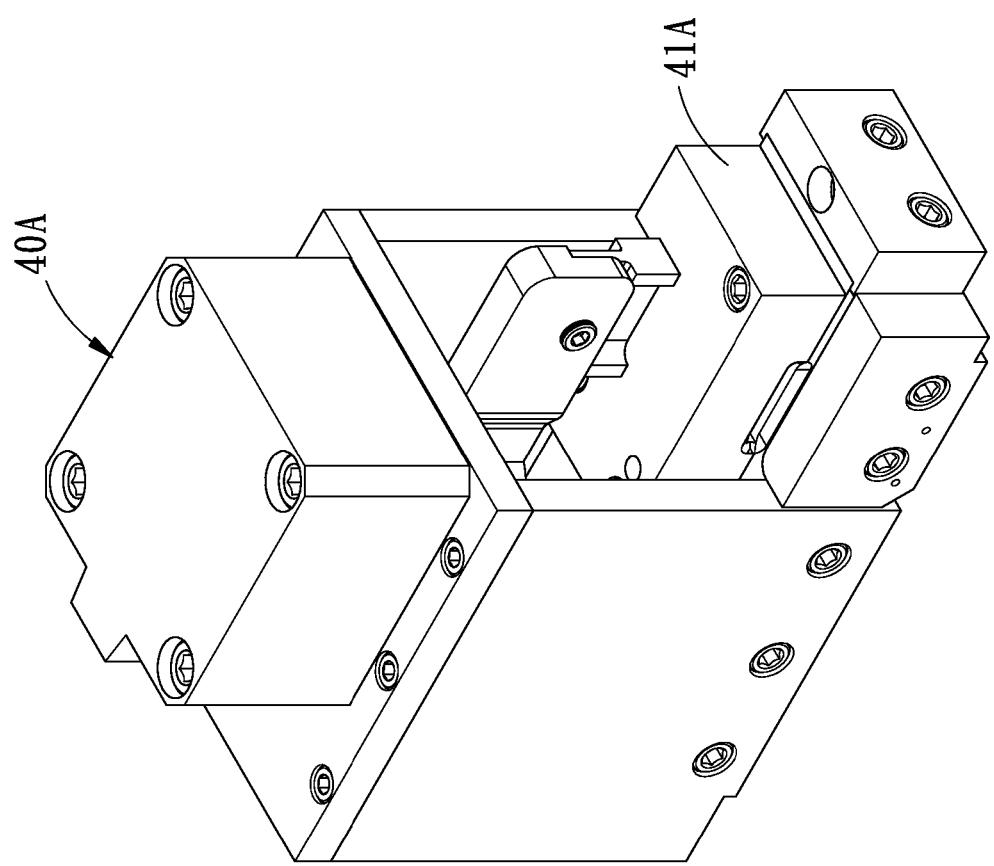
FIG. 6 is a perspective view of a cutting module in accordance with the present invention.

A cutting module 40A, as shown in FIG. 6, is disposed on an end portion of the main slide rail 11A (from which the slats leave the main slide rail 11A) on the punching base 10A, and provided with a cutting portion 41A for cutting the slats into a predetermined length.

Figure 7:
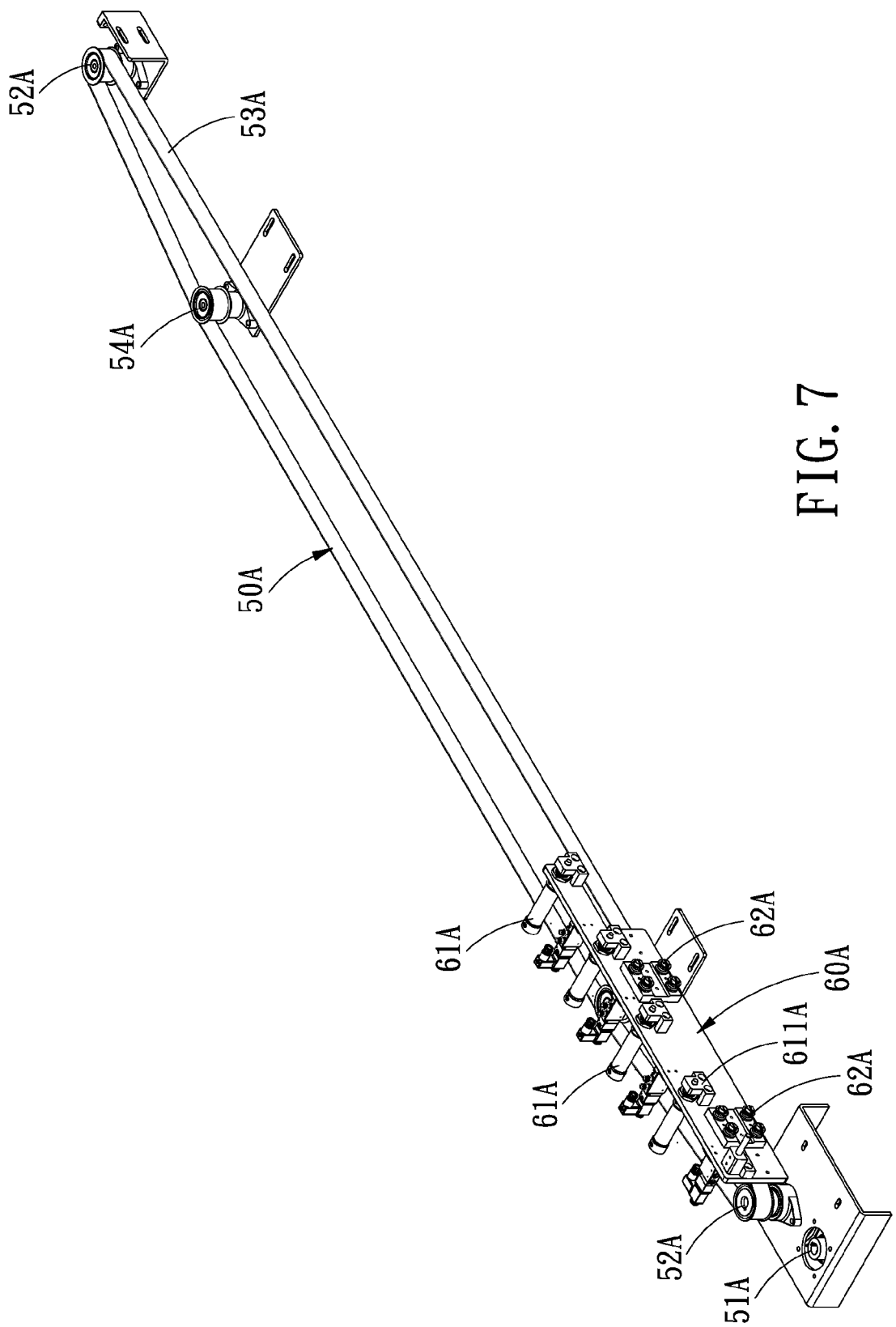
FIG. 7 is a perspective view of a hole position adjustment assembly in accordance with the present invention.

A hole-position adjustment assembly 50A, as shown in FIG. 7, is disposed at one side of the punching base 10A for driving the respective hole processing modules 30A to move and includes a servo motor 51A, two drive wheels 52A, a connecting strap 53A and at least one idle wheel 54A. The two drive wheels 52A are disposed on both ends of the punching base 10A, and one of the drive wheels 52A is driven by the servo motor 51A. The connecting strap 53A is a notched belt wound around the two drive wheels 52A. The idle wheel 54A is disposed on the connecting strap 53A for adjusting tension of the connecting strap 53A.

A hole position control frame 60A, as shown in FIG. 7, is disposed on the auxiliary slide rail 12A parallel to the punching base 10A and combined with the connecting strap 53A of the hole position adjustment assembly 50A. The hole position control frame 60A is driven by the hole position adjustment assembly 50A to accurately move relative to the auxiliary slide rail 12A. The hole position control frame 60A is provided with plural movable assemblies 61A cooperating with the hole processing modules 30A, and each of the movable assemblies 61A includes an extension linkage rod 611A in alignment with the respective linkage holes 33A. Further, the hole position control frame 60A is further provided with plural wheel frames 62A fitted on the auxiliary slide rail 12A.

A cord inserting base 10B is provided with a main slide rail 11B on a top thereof, and an auxiliary slide rail 12B at an external side thereof.

Figure 8A:
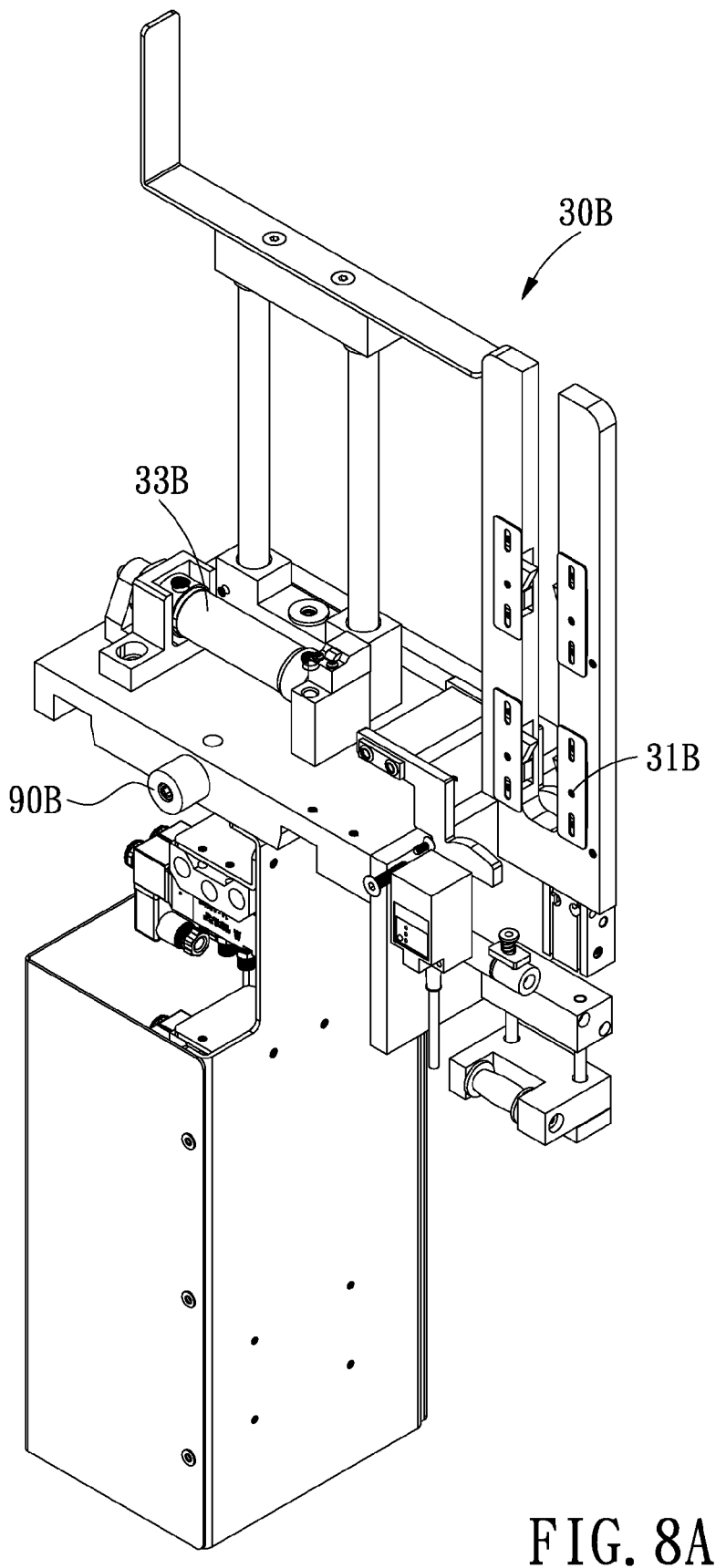
FIG. 8A is a perspective view of a cord processing module in accordance with the present invention.
Figure 8B:
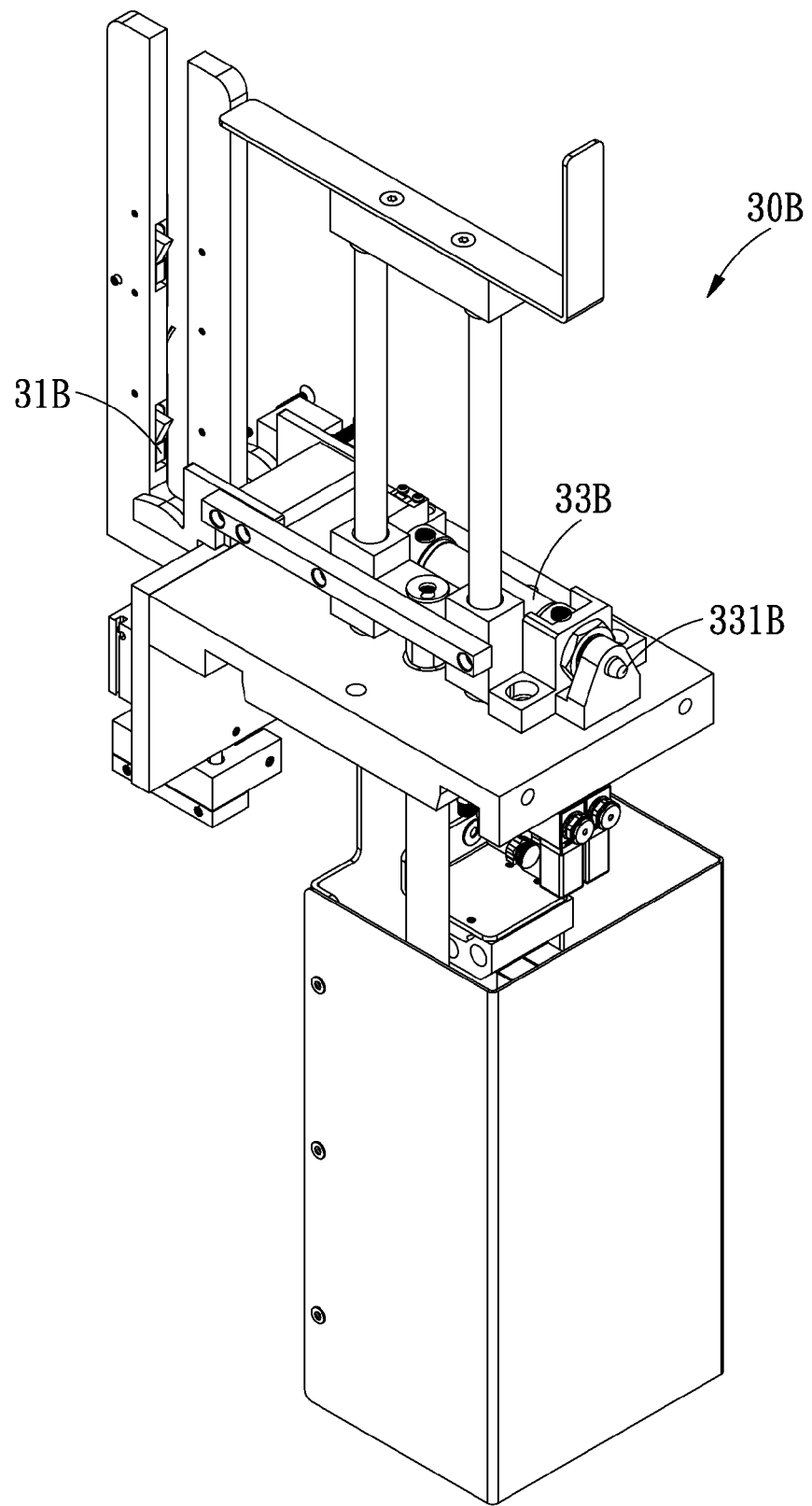
FIG. 8B is another perspective view of the cord processing module in accordance with the present invention.

Plural cord processing modules 30B, as shown in FIGS. 8A and 8B, are movably disposed on the main slide rail 11B and each include a cord inserting portion 31B for inserting cords through the holes of the slats, a limit assembly 32B opposite the main slide rail 11B, and a movable assembly 33B including an extension linkage rod 331B. The limit assembly 32B includes a power cylinder 321B having an extension rod 322B provided at one extended end thereof with a clamping block 323B which can move relative to one side of the main slide rail 11B. When the extension rod 322B extends, the clamping block 323B will be caused to clamp against the main slide rail to fix the cord processing module 30B on the main slide rail 11B, and when the extension rod 322B retracts, the clamping block 323B will be retracted to release the cord processing module 30B and allow it to move relative to the main slide rail 11B.

Figure 9:
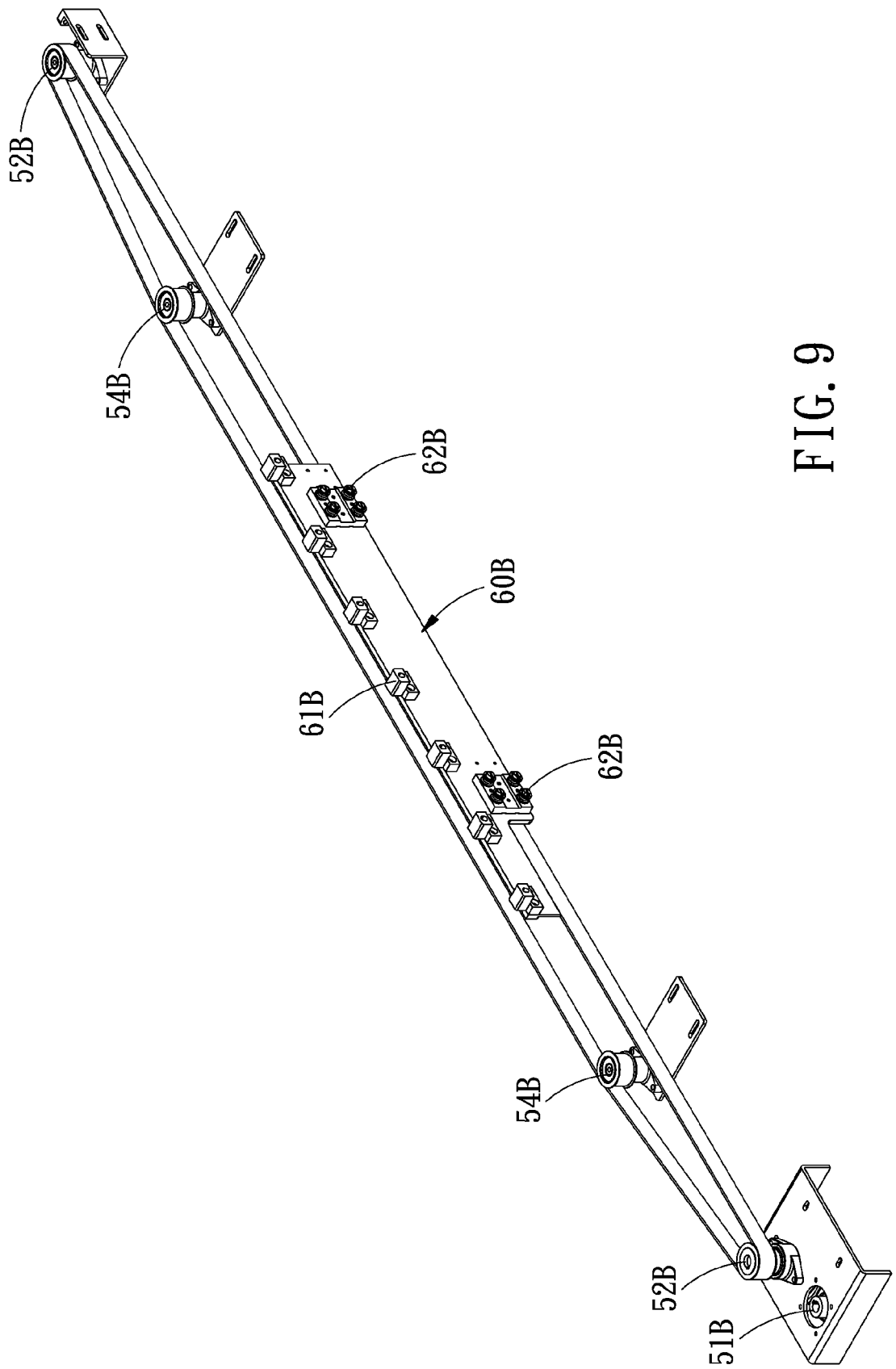
FIG. 9 is a perspective view of a cord position adjustment assembly in accordance with the present invention.

A cord position adjustment assembly 50B, as shown in FIG. 9, is disposed at one side of the cord inserting base 10B for driving the respective cord processing modules 30B to move and includes a servo motor 51B, two drive wheels 52B, a connecting strap 53B and at least one idle wheel 54B. The two drive wheels 52B are disposed on both ends of the cord inserting base 10B, and one of the drive wheels 52B is driven by the servo motor 51B. The connecting strap 53B is a notched belt wound around the two drive wheels 52B. The idle wheel 54B is disposed on the connecting strap 53B for adjusting tension of the connecting strap 53B.

A cord position control frame 60B, as shown in FIG. 9, is disposed on the auxiliary slide rail 12B parallel to the cord inserting base 10B and combined with the connecting strap 53B of the cord position adjustment assembly 50B. The cord position control frame 60B is driven by the cord position adjustment assembly 50B to accurately move relative to the auxiliary slide rail 12B. The cord position control frame 60B is provided with plural linkage holes 61B cooperating with the respective cord processing modules 30B, and plural wheel frames 62B fitted on the auxiliary slide rail 12B.

A central control assembly 70 is employed to perform the following operations:

1. controlling the slat forming assembly 20A to form slats by rolling;
2. controlling the servo motor 51A of the hole position adjustment assembly 50A to move the hole position control frame 60A to a predetermined position;
3. controlling the linkage rods 611A of the movable assembles 61A to extend and retract;
4. controlling the cutting module 40A to cut the slats into the predetermined length;
5. controlling the linkage rods 331B of the cord processing modules 30B to retract and extend; and
6. controlling the servo motor 51B of the cord position adjustment assembly 50B to move the cord position control frame 60B to a predetermined position.

Figure 10:
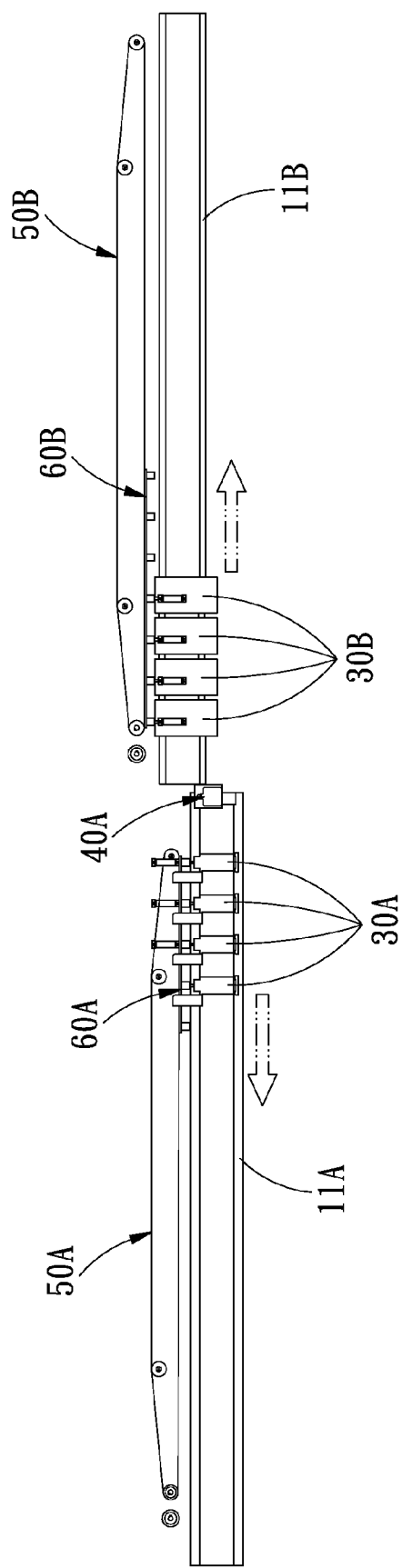
FIG. 10 is a side view showing an original state of the processing module positioning system for window blind slats in accordance with the present invention.
Figure 11A:
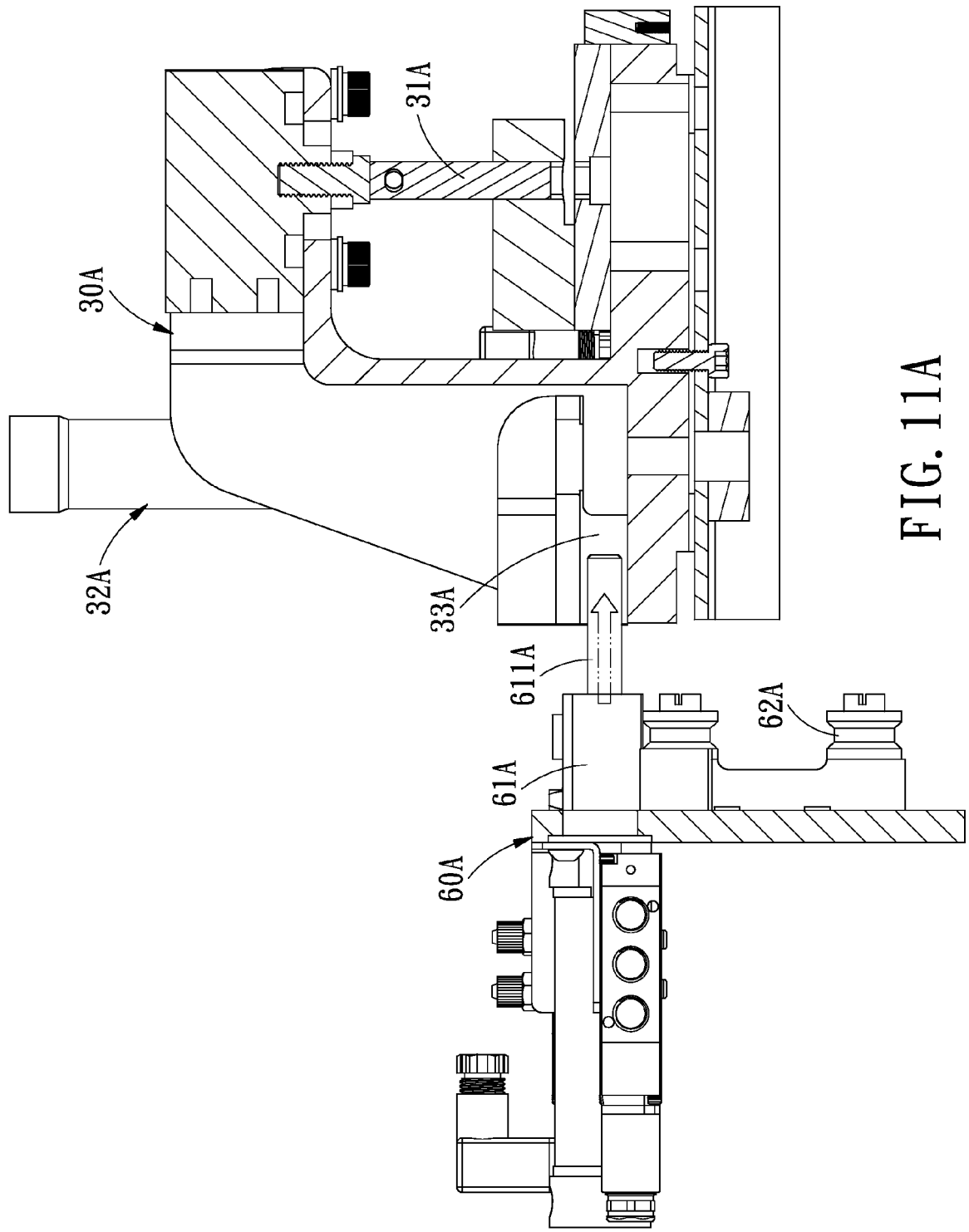
FIG. 11A is a cross sectional view showing how the hole processing module is connected to the hole position control frame in accordance with the present invention.
Figure 11B:
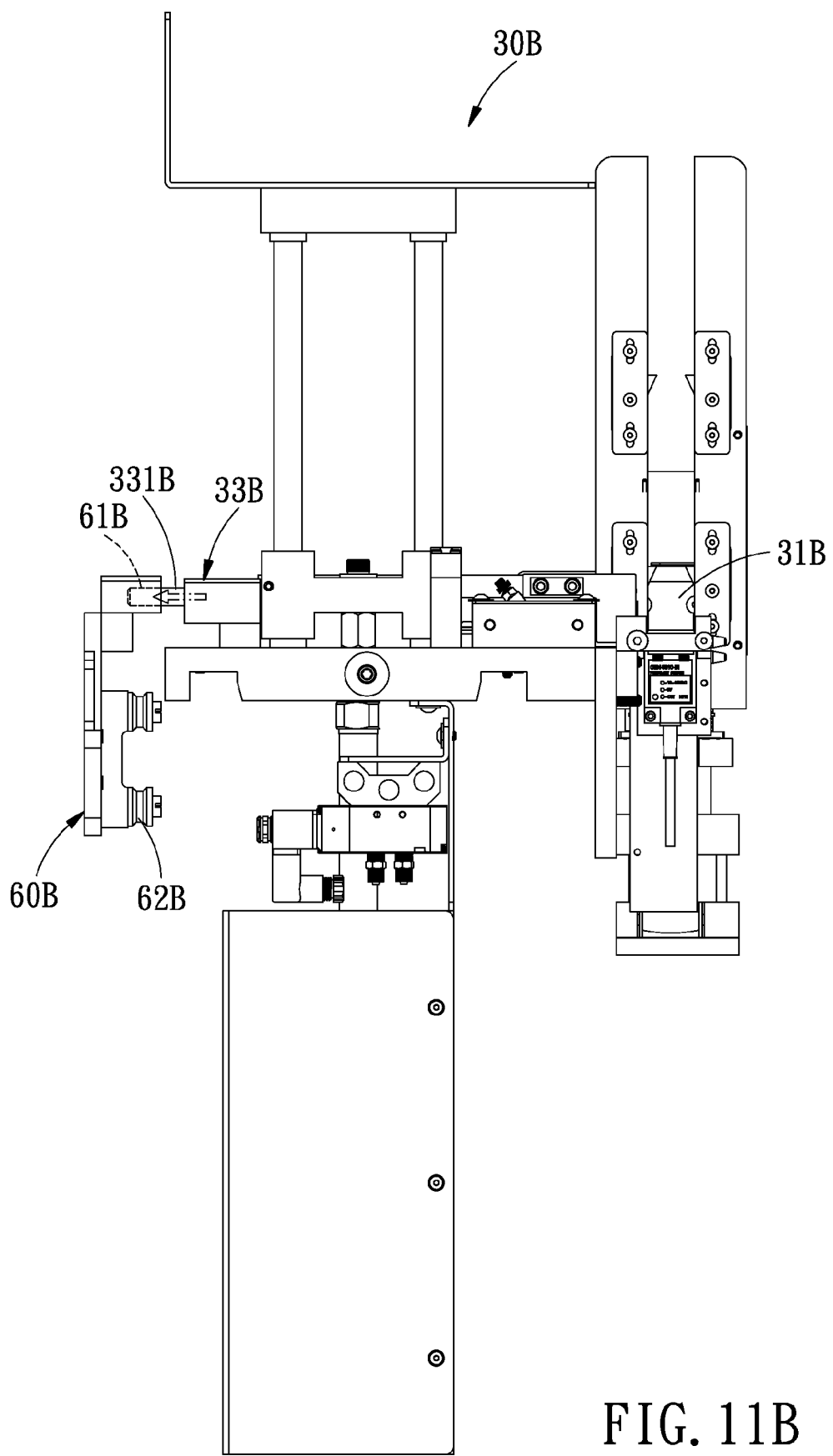
FIG. 11B is a side view showing how the cord processing module is connected to the cord position control frame in accordance with the present invention.
Figure 12:
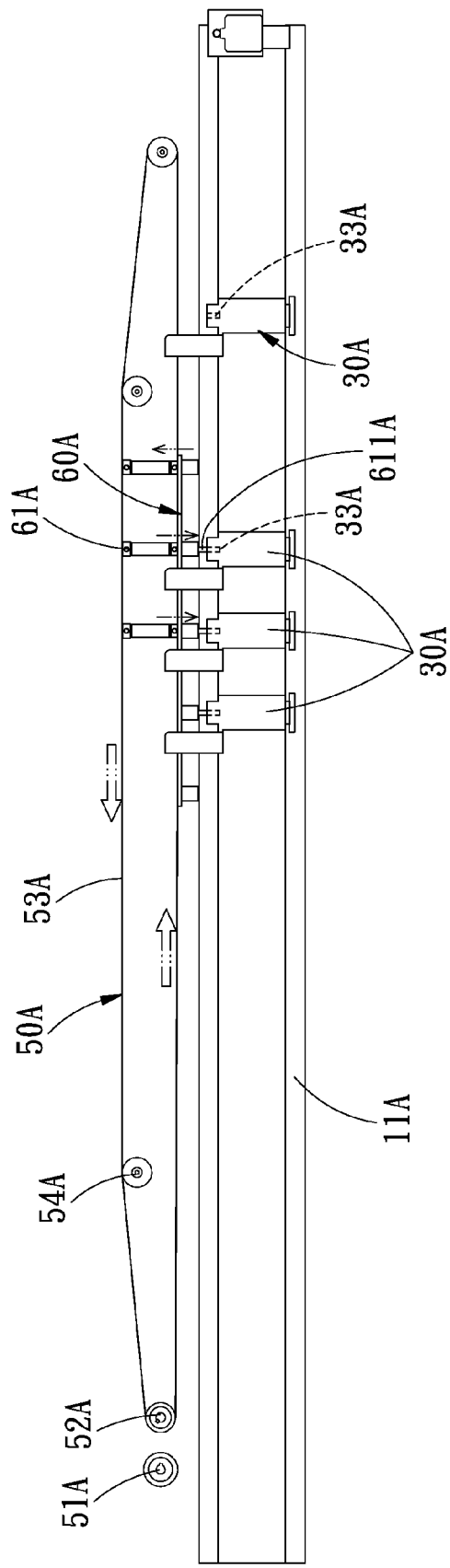
FIG. 12 is operational view showing the hole processing modules are moved and positioned in accordance with the present invention.
Figure 14A:
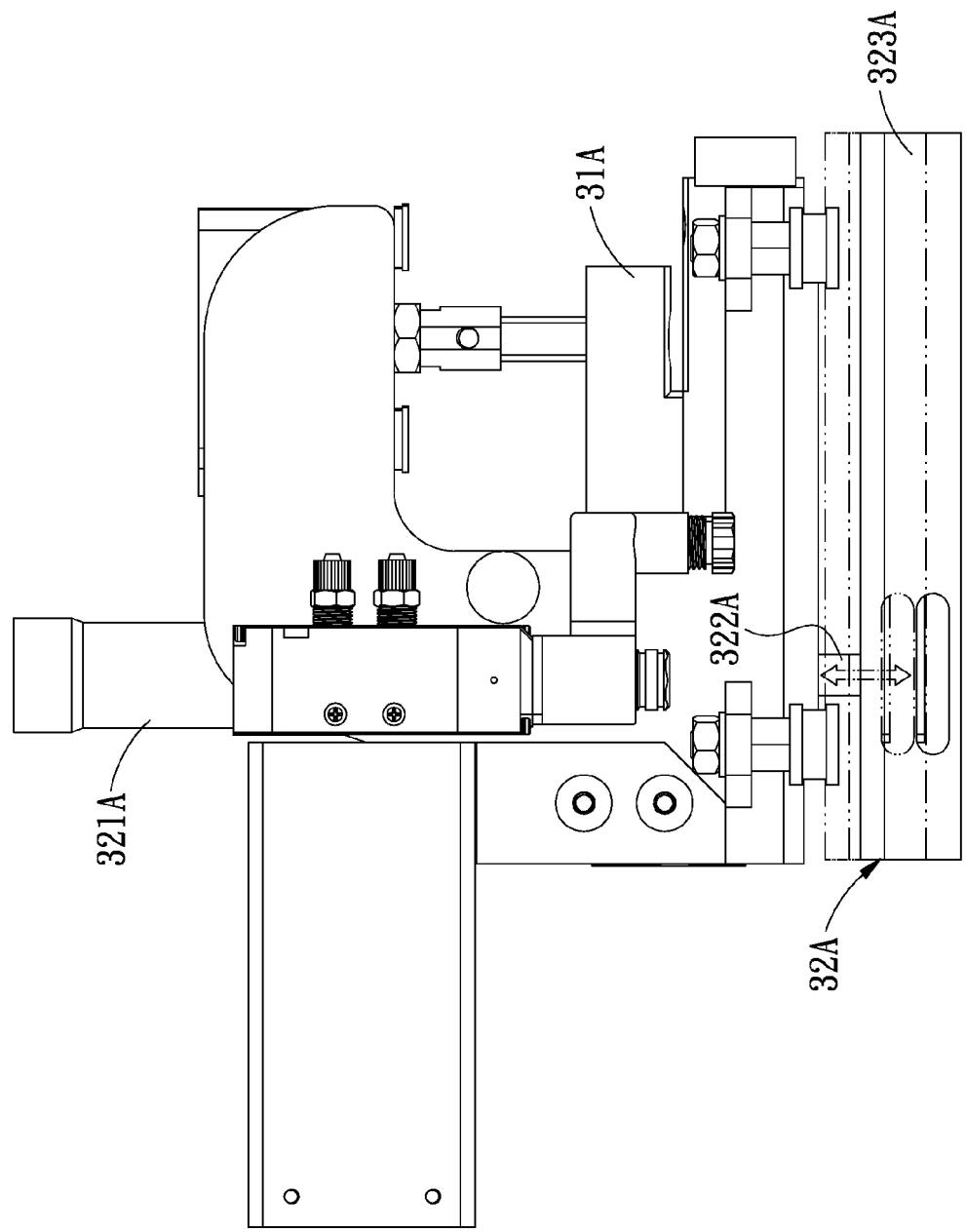
FIG. 14A is a side view showing how the hole processing module is fixed after being moved and positioned in accordance with the present invention.
Figure 14B:
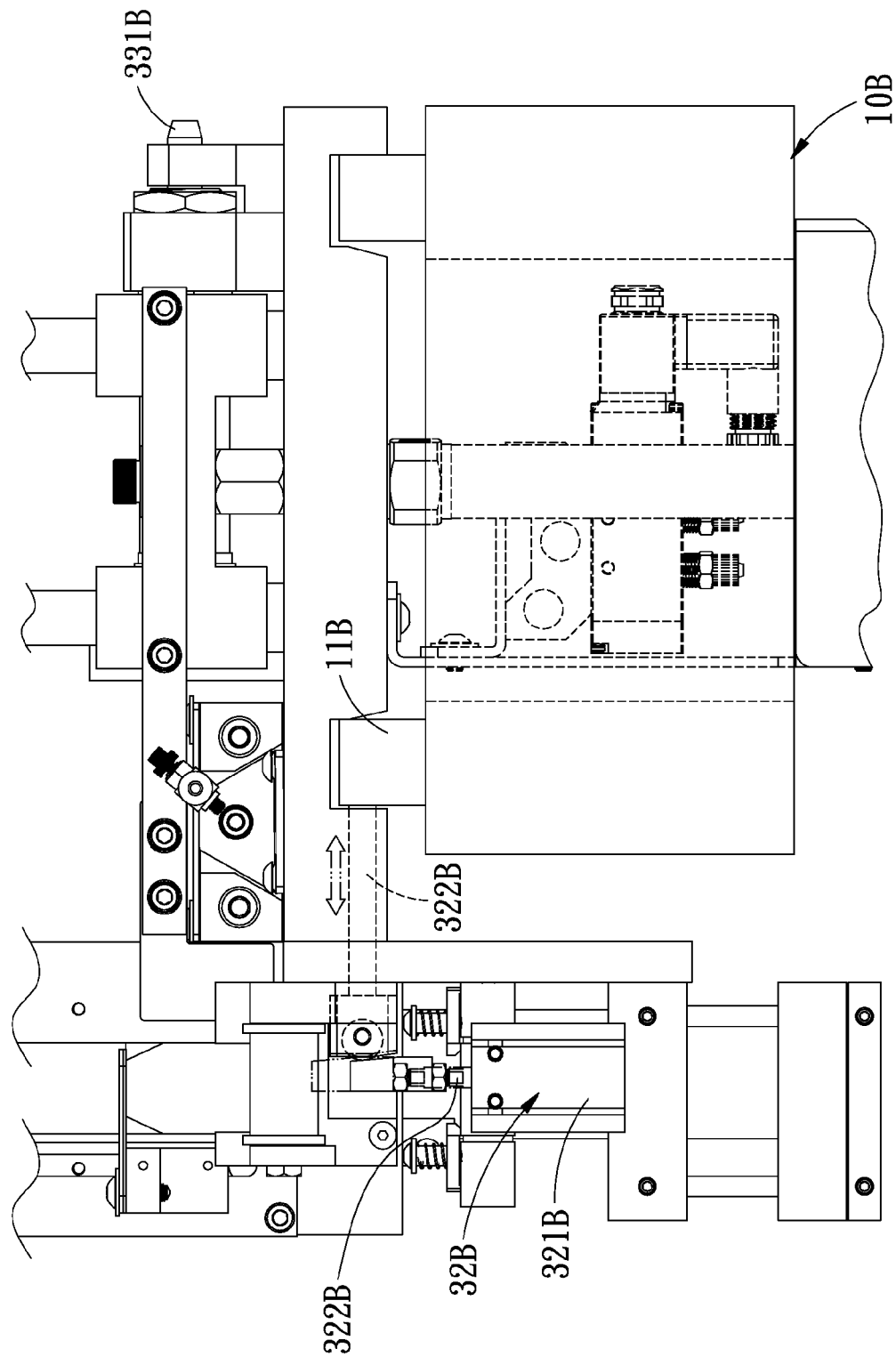
FIG. 14B is a side view showing how the cord processing module is fixed after being moved and positioned in accordance with the present invention.
Figure 15:
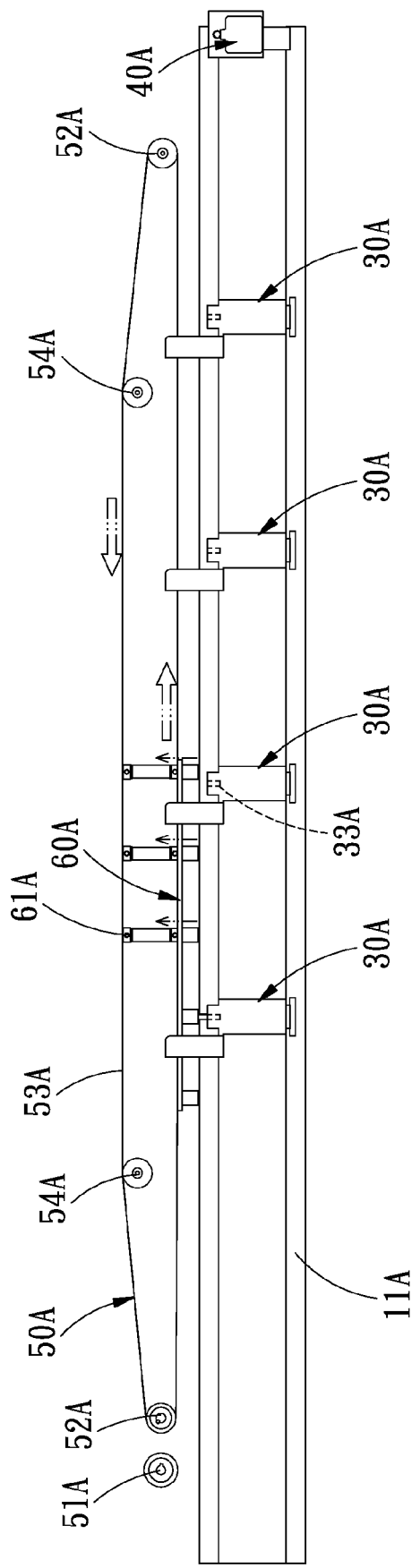
FIG. 15 is a side view showing an operational state of the hole processing modules after being moved and positioned in accordance with the present invention.
Figure 16:
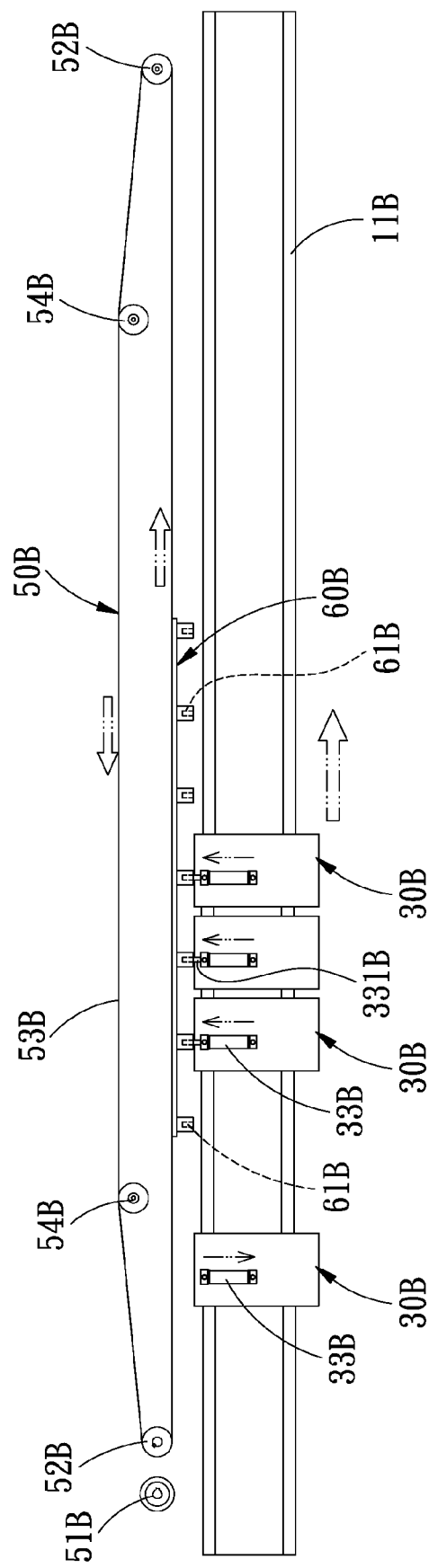
FIG. 16 a side view showing how the cord processing modules are moved and positioned in accordance with the present invention.
Figure 17:
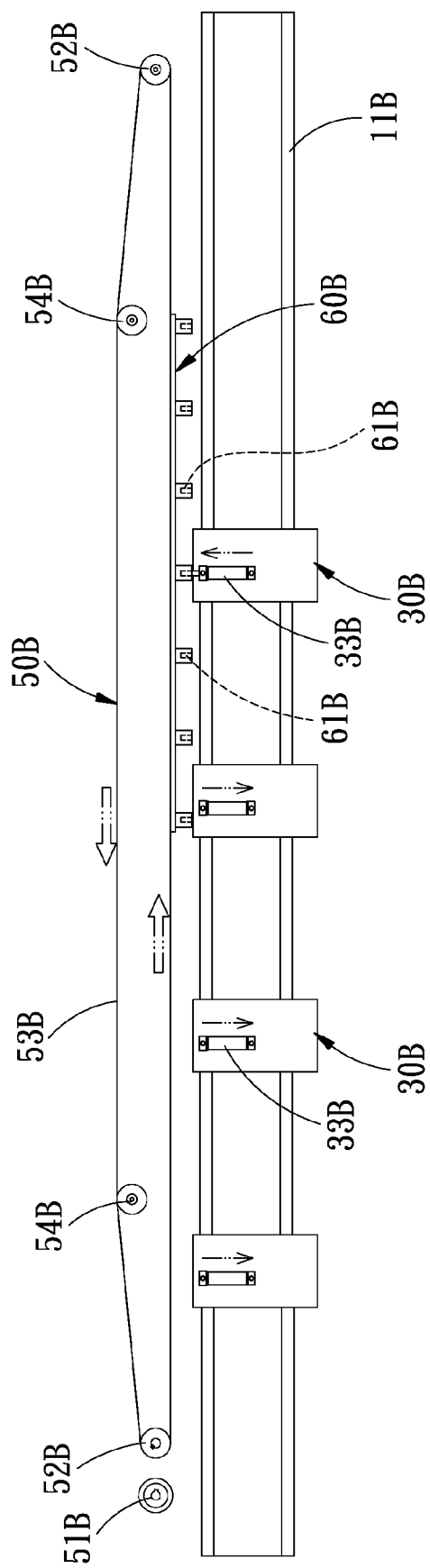
FIG. 17 is a side view showing an operational state of the cord processing modules after being moved and positioned in accordance with the present invention.

The hole processing modules 30A, before being moved, are disposed on one end of the punching base 10A adjacent to the cutting module 40A in sequence (can also be disposed on the other end of the punching base 10A adjacent to the slat forming assembly 20A as desired). As shown in FIGS. 10 and 11A, the linkage rods 611A of the hole position control frame 60A penetrate the respective linkage holes 33A to connect the hole processing modules 30A to the hole position control frame 60A. When the hole processing modules 30A need to be moved to predetermined positions, the servo motor 51A of the hole position adjustment assembly 50A is employed to rotate the connecting strap 53A to make the hole position control frame 60A move all the connected hole processing modules 30A. After a first hole processing module 30A is moved to and positioned at its predetermined position, the connected linkage rod 611A will disengage from the corresponding linkage hole 33A to disconnect the first hole processing module 30A from the hole position control frame 60A, as shown in FIGS. 12 and 13A, and then the first hole processing module 30A will be fixed by the limit assembly 32A. As shown in FIGS. 14A and 14B, in the same way as described above, the hole position adjustment assembly 50A and the hole position control frame 60A will move other hole processing modules 30A to the predetermined positions and fix them in sequence. As shown in FIG. 15, the last hole processing module 30A can keep connecting with the hole position control frame 60A without disengaging the linkage rod 611A from the linkage hole 33A. When the hole processing modules 30A need to be repositioned or returned to their original positions, the hole position adjustment assembly 50A and the hole position control frame 60A will operate reversely to drive the respective hole processing modules 30A to their original positions or readjust the positions of the hole processing modules 30A.

The cord processing modules 30B are moved in the same manner as the hole processing modules 30A. Referring to FIGS. 10, 11B, 13B, 14B, 16, and 17, before being moved, the cord processing modules 30B are disposed on one end of the cord inserting base 10B adjacent to the cutting module 40A (or on the other end of the cord inserting base 10B as desired). The linkage rods 331B penetrate the respective linkage holes 61B of the cord position control frame 60B to connect the cord processing modules 30B to the cord position control frame 60B. When the cord processing modules 30B need to be moved to predetermined positions, the servo motor 51B of the cord position adjustment assembly 50B is employed to rotate the connecting strap 53B to make the cord position control frame 60B move all the connected cord processing modules 30B. After a first cord processing module 30B is moved to its predetermined position and positioned, the connected linkage rod 331B will disengage from the corresponding linkage hole 61B to disconnect the first cord processing module 30B from the cord position control frame 60B, and then the first cord processing module 30B will be fixed by the limit assembly 32B. Subsequently, in the same way as described above, the cord position adjustment assembly 50B and the cord position control frame 60B will move other cord processing modules 30B to the predetermined positions and fix them in sequence. The last cord processing module 30B can keep connecting with the cord position control frame 60B without disengaging the linkage rod 311B from the linkage hole 61B. When the cord processing modules 30B need to be repositioned or returned to their original positions, the cord position adjustment assembly 50B and the cord position control frame 60B will operate reversely to drive the respective cord processing modules 30B to their original positions or readjust the positions of the cord processing modules 30B.

The punching base 10A is further provided with two suspending support wires 80A between the punching portion 31A of the respective hole processing modules 30A and the cutting module 40A for supporting the slats to move linearly with less friction.

Between each two neighboring hole processing modules 30A and each two cord processing modules 30B is disposed a spacing cylinder 90A, 90B, respectively for restricting a minimum distance between each two neighboring hole processing modules 30A and each two cord processing modules 30B to avoid the occurrence of excessive small distance therebetween, thus ensuring the control frames 60A, 60B to be returned to their original positions smoothly.

As known from the above description, the present invention has the following advantages:

1. The position adjustment assemblies 50A, 50B of the present invention each only utilize a single servo motor 51A, 51B to drive plural modules 30A, 30B to move to predetermined positions, thus greatly reducing the production cost, and further enhancing industrial competitiveness;
2. The control frames 60A, 60B can be controlled by a single servo motor 51A, 51B to move and position plural modules 30A, 30B in good order, and the single servo motors are both of a single control type, thus simplifying programming.

While we have shown and described various embodiments in accordance with the present invention, it is clear to those skilled in the art that further embodiments may be made without departing from the scope of the present invention.

What is claimed is:

1. A processing module positioning system for positioning processing modules for processing window blind slats in an apparatus for producing window blinds, said processing module positioning system comprising:
    a base being provided with a main slide rail on a top thereof, and an auxiliary slide rail at an external side thereof;
    plural processing modules being movably disposed on the main slide rail for processing slats;
    a position adjustment assembly being disposed at one side of the base for driving the respective processing modules to move; and
    a position control frame being disposed on the auxiliary slide rail and combined with the position adjustment assembly, the position control frame being controlled to move relative to the auxiliary slide rail by the position adjustment assembly; wherein:
    the plural processing modules and the position control frame are provided with plural linkage rods and plural linkage holes that cooperate with each other in such a manner that the linkage rods selectively engage into and disengage from the linkage holes to selectively connect and disconnect each of the processing modules to and from the position control frame.

2. The processing module positioning system as claimed in claim 1, wherein the base is a punching base, the processing modules are hole processing modules, the position adjustment assembly is a hole position adjustment assembly, and the position control frame is a hole position control frame.

3. The processing module positioning system as claimed in claim 2 further comprising a slat forming assembly assembled on one end of the punching base for forming and supplying semi-finished slats to the punching base and the hole-processing modules.

4. The processing module positioning system as claimed in claim 2 further comprising a cutting module which is disposed on an end of the punching base and includes a cutting portion for cutting the slats.

5. The processing module positioning system as claimed in claim 2, wherein the hole processing modules each include a punching portion for punching holes in the slats, and a limit assembly, the limit assembly includes a power cylinder having an extension rod provided with a clamping block at an end thereof under the main slide rail, such that when the extension rod retracts relative to the power cylinder, the clamping block will be caused to clamp against the main slide rail to fix the respective hole processing module on the main slide rail, and when the extension rod extends relative to the power cylinder, the respective hole processing module will be released and allowed to move relative to the main slide rail.

6. The processing module positioning system as claimed in claim 2, wherein the position adjustment assembly further includes at least one idle wheel on a connecting strap, the at least one idle wheel being for adjusting tension of the connecting strap.

7. The processing module positioning system as claimed in claim 6, wherein the connecting strap is a notched belt.

8. The processing module positioning system as claimed in claim 2, wherein the position control frame is provided with plural wheel frames fitted on the auxiliary slide rail.

9. The processing module positioning system as claimed in claim 1, wherein the base is a cord inserting base, the processing modules are cord processing modules, the position adjustment assembly is a cord position adjustment assembly, and the position control frame is a cord position control frame.

10. The processing module positioning system as claimed in claim 9, wherein the cord processing modules each include a cord inserting portion for inserting cords through holes defined in the slats, and a limit assembly, the limit assembly includes a power cylinder having an extension rod provided with a clamping block at an end thereof, such that the clamping block moves relative to one side of the main slide rail, and when the extension rod extends relative to the power cylinder, the clamping block will be caused to clamp against the main slide rail to fix the respective cord processing module on the main slide rail, and when the extension rod retracts relative to the power cylinder, the clamping block will be retracted to release the respective cord processing module and allow the respective cord processing module to move relative to the main slide rail.

11. The processing module positioning system as claimed in claim 9, wherein the position adjustment assembly further includes at least one idle wheel on a connecting strap, the at least one idle wheel being for adjusting tension of the connecting strap.

12. The processing module positioning system as claimed in claim 11, wherein the connecting strap is a notched belt.

13. The processing module positioning system as claimed in claim 9, wherein the position control frame is provided with plural wheel frames fitted on the auxiliary slide rail.

14. The processing module positioning system as claimed in claim 1, wherein the position adjustment assembly further includes at least one idle wheel on a connecting strap, the at least one idle wheel being for adjusting tension of the connecting strap.

15. The processing module positioning system as claimed in claim 14, wherein the connecting strap is a notched belt.

16. The processing module positioning system as claimed in claim 1, wherein the position control frame is provided with plural wheel frames fitted on the auxiliary slide rail.

\* \* \* \* \*